3,349,148
POLYMERIZATION PROCESS

Warren V. Bush, Walnut Creek, Calif., assignor to Shell Oil Company, New York, N.Y., a corporation of Delaware
No Drawing. Filed May 8, 1964, Ser. No. 366,126
9 Claims. (Cl. 260—683.15)

ABSTRACT OF THE DISCLOSURE

A process for the production of useful lubricants and oil additives having low pour point, good viscosity index and good oxidation stability in which olefins having a tertiary hydrogen on a carbon adjacent to a double bonded carbon atom are subjected to hydride shift polymerization in the presence of a tetrahaloaluminate catalyst.

---

This invention relates to the polymerization of certain olefins with tetrahaloaluminate catalysts. In a preferred form, this invention relates to the polymerization of 3-methylbutene-1, with hydrido shift, to a molecular weight of at least 300.

In recent years, there has been an increased interest in preparing lubricant base stocks and oil additives from polymers of low molecular weight olefins. Although polymers have achieved some commercial use as additives, such as viscosity-index improvers, thickeners, and dispersant bases, their use has been limited because of certain undesirable properties. For example, polyisobutylene, after hydrogenation, has relatively poor viscosity-temperature characteristics and is susceptible to degradation by shear and heat. These undesirable characteristics are believed to be caused, at least in part, by the rigid, strained nature of the polyisobutylene molecule, a result of the "repulsion" or "crowding" of the gem-dimethyl groups on alternate carbon atoms in the main chain.

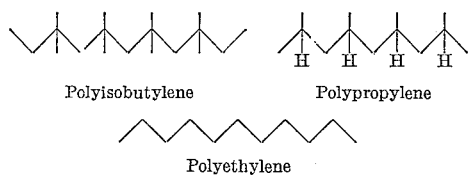

Polyisobutylene        Polypropylene

Polyethylene

Polypropylene, while not having the rigid nature of the polyisobutylene molecule, has tertiary hydrogen atoms at each second carbon of the main chain (see skeletal diagram). These tertiary hydrogens are potential sites for severe oxidative attack. Ethylene polymers have very high pour points attributable to the lack of side chains.

It is apparent that the insertion of another methylene group between the quaternary carbon atoms in the polyisobutylene chain would relieve molecular crowding, or strain, while retaining other desirable properties (e.g., low pour point, oxidation stability). This hypothetical polymer can be realized by the 1,3-polymerization of 3-methylbutene-1; i.e., by polymerizing in such a manner that the 1 and 3 carbon atoms of the monomer become part of the chain.

In order to obtain this 1,3 polymer, a hydride shift must occur from carbon atom 3 to carbon atom 2 for each monomer adding to the main chain. A hydride ion is a hydrogen atom with two electrons. The hydride shift mechanism is as follows:

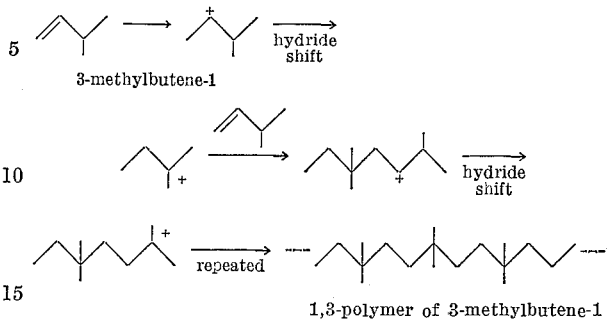

1,3-polymer of 3-methylbutene-1

Hydride shift polymers of 3-methylbutene-1 have been reported by Kennedy and Thomas, Makromolekulare Chemie, vol. 53, p. 28 (1962) and vol. 64, p. 1 (1963). These polymers were crystalline materials of high molecular weights (about 50,000) obtained over very active Friedel-Crafts catalysts (e.g., $AlCl_3$) at temperatures of $-130°$ C. and below. The high molecular weights of these polymers, of course, precludes their use as lubricants and limits their use in oil additives. Although in theory polymers of lower molecular weight could be made by operating at higher temperatures, strongly acidic catalysts such as $AlCl_3$ become isomerization catalysts at temperatures of $0°$ C. and above. Skeletal isomerization of the polymer chain would result in the formation of tertiary carbon atoms, known to be sites of easy oxidative attack. Furthermore, it is indicated in the articles by Kennedy and Thomas that 1,2 polymerization rather than 1,3 polymerization was obtained at higher temperatures.

It has now been found that hydride shift polymerization of certain olefins characterized by a tertiary hydrogen on a carbon atom adjacent to a double bonded carbon atom can be induced by tetrahaloaluminate catalysts. These olefins have the general formula $$R_1CH=CHCHR_2R$$

where $R_1$ is hydrogen, methyl or ethyl; $R_2$ is methyl, ethyl or propyl; and $R_3$ is a normal alkyl group having from 1 to about 20 carbon atoms. Preferred olefins are 3-ethylpentene-1 and 3-methylbutene-1, especially the latter. Hydride shift polymerization of this class of monomers provides one extra methylene group per unit between the side chains on the main polymer, thereby imparting more "flexibility" to the molecule and improving shear resistance and viscosity-temperature properties. The essence of the reactions of the invention is the hydride shift from the tertiary carbon atom to the adjacent double-bonded carbon, allowing another polymerizing fragment to attach at the tertiary carbon and form a quaternary carbon atom. Polymers of the invention have number average molecular weights of at least about 300, preferably at least about 400.

Tetrahaloaluminate catalysts have the general formula $M(AlX_4)_n$ wherein M is a metal or a mixture of metals, especially a metal from group I, II, or VIII of the Periodic Table, more preferably Li, Be, Na, Mg, Fe, Co, Ni, or Ag, especially Li, Na, and Co; $n$ is a whole number equal to the valence of M (i.e., $n$ is one if M is monovalent, two if M is divalent, etc.) and X is a halogen, preferably chlorine, bromine or iodine. Tetrahaloaluminates are white to greyish, brittle, low-melting crystalline solids. Most $M(AlX_4)_n$ compounds can be prepared by melting together appropriate quantities of the component MX or MX$_2$ (or a mixture thereof) and AlX$_3$ salts (e.g., NaCl and AlCl$_3$, MgCl$_2$ and AlCl$_3$, LiCl and AlCl$_3$, NaBr and AlBr$_3$, LiBr and AlBr$_3$, etc.). Alternatively, the component salts may be combined in solution; suitable solvents include arsenic and antimony halides, halogenated aromatic or aliphatic hydrocarbons, and nitrobenzene. The activity of these catalysts can be varied by changing M and X, with the activity being, e.g., Li>Na>K and I>Br>Cl. It is also contemplated that salts containing more than one halogen (e.g., NaAlCl$_3$Br, LiAlBr$_3$Cl, etc.) having intermediate activities be used in accord with the invention.

Some examples of tetrahaloaluminates contemplated for use in the invention are: NaAlCl$_4$, LiAlCl$_4$, Co(AlCl$_4$)$_2$, AgAlCl$_4$, NaAlBr$_4$, LiAlBr$_4$, Be(AlBr$_4$)$_2$, Mg(AlCl$_4$)$_2$, Fe(AlCl$_4$)$_2$, Ni(AlBr$_4$)$_2$, LiAlI$_4$, etc.

As a group, the tetrahaloaluminates are far less active than aluminum halide catalysts (e.g., AlCl$_3$) being considerably less acidic in nature; for this reason it is quite surprising that these catalysts induce hydride shift polymerization, which is generally believed to occur only over strong acid catalysts. For example, polymers of 3-methylbutene-1 catalyzed by other weak acids, such as TiCl$_4$, aluminum alkyls, and alkyl tin halides have the 1,2 polymer structure shown below:

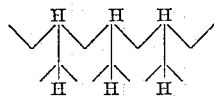

This polymer is very unstable to oxidation because of the presence of tertiary hydrogens and is therefore an undesirable lubricant constituent.

For the process of this invention, tetrahaloaluminates have several advantages over prior art catalysts. As mentioned above, tetrahaloaluminates can produce hydride-shift polymers in the lube-oil range. Furthermore, temperatures at which these oils are produced are generally above about 0° C., substantially obviating the high refrigeration costs of strong-acid-catalyzed processes. In addition, tetrahaloaluminates produce "regular" polymers, since, being weak acids, they do not activate isomerization and depolymerization of the polymer chain. These catalysts are inexpensive, non-corrosive, and substantially non-sludge-forming. Tetrahaloaluminates are also substantially insoluble in hydrocarbons and are therefore easy to handle.

The ease of handling the tetrahaloaluminate catalysts allows adaptability to a great variety of process schemes.

In general, the catalysts can be employed in any fashion known to those skilled in the art; for example, the catalyst can be powdered and used as a solid (at temperatures below the melting point of the salt), or can be used as a molten salt catalyst or supported on an inert carrier, such as porcelain, alumina, or charcoal. Reactants, which comprise one or more unsaturated compounds, can be fed with or without a solvent to a reactor which contains the catalyst. If the catalyst is in the solid form, the catalyst may be retained in the reactor or part may be allowed to pass out with the reactor effluent. If some of the catalyst leaves the reactor, it may be separated and recycled or discarded, or may be allowed to pass out with the product. If the catalyst is used in the molten form, it may be separated from the reactor effluent (in which it is substantially insoluble) and recycled or discarded. Generally, any substance in which the reactants are soluble and which does not take part in the reaction is a suitable solvent; as examples, mention may be made of paraffins, such as isooctane; halogenated alkanes, such as methyl and ethyl chlorides and methyl and ethyl bromides; 1,2-dichloroethane, nitrobenzene, nitromethane, etc. It is preferred to carry out the reaction in the presence of a solvent, because dilution of the monomer shows the addition rate of the monomer relative to the hydride shift reaction, insuring a high percentage of hydride-shift polymer. Furthermore, it is generally easier to handle the polymer in solution. When a solvent is used, volumetric solvent/monomer ratios are from about 0.5 to about 20, preferably from about 1 to about 10.

Polymerization temperatures are below about 150° C. and are usually in the range of from about —50° C. to about 120° C., preferably from about 0 to about 100° C., depending on the nature and concentration of the monomer and the desired molecular weight of the polymer. Liquid phase polymerization processes are preferred; in vapor phase polymerizations, very high vapor velocities are necessary to prevent the catalyst from becoming coated with polymer, thereby being rendered ineffective, whereas in liquid phase processes the liquid monomer and solvent sweep the polymer from the catalyst surface. Process pressures are not critical, except to keep the system substantially in the liquid phase; autogenous pressures are generally satisfactory.

Polymer products contemplated in the invention are substantially hydride-shift polymers; i.e., at least 75% and preferably at least 85% of the monomers are polymerized with hydride shift.

The following table illustrates the results of 3-methylbutene-1 polymerization over various tetrahaloaluminate catalysts. Product structure was determined by nuclear magnetic resonance and confirmed by infrared analyses to be at least 80% 1,3 polymer in each case.

POLYMERIZATION OF 3-METHYLBUTENE-1 WITH HYDRIDE SHIFT OVER TETRAHALOALUMINATE SALTS

| | Experiment Number [1] | | | | | | |
|---|---|---|---|---|---|---|---|
| | 1 | 2 | 3 | 4 | 5 | 6 | 7 |
| 3-methylbutene-1 (I) mmoles | 713 | 799 | 442 | 539 | 372 | 538 | 538. |
| Solvent (II) | None | n-C$_6$H$_{14}$ | n-C$_6$H$_{14}$ | "Isooctane" | 1,2-C$_2$H$_4$Cl$_2$ | 1,2-C$_2$H$_4$Cl$_2$ | "Isooctane." |
| Solvent, mmoles | | 230 | 230 | 113 | 247 | 252 | 115. |
| Catalyst (III) | LiAlCl$_4$ | LiAlCl$_4$ | LiAlCl$_4$ | NaAlCl$_4$ | NaAlCl$_4$ | Co(AlCl$_4$)$_2$ | Co(AlCl$_4$)$_2$. |
| Catalyst, mmoles | 28.1 | 4.2 | 4.2 | 4.7 | 5.6 | 3.5 | 3.5. |
| Order of addition | III, I | I, III [3] | I, III [3] | III, II, I [4] | III, II, I [4] | III, II, I [4] | III, II, I [4]. |
| Temperature, ° C.±5 | 20-40 max | 30 | 65 | 105 | 100 | 104 | 105. |
| Pressure, p.s.i.g. ±5 | 15 | 10 | 46 | ca. 25 | ca. 25 | ca. 25 | ca. 25. |
| Time, hr | 0.2 | 1.2 | 0.6 | 2.0 | 1.3 | 2.0 | 2.0. |
| Recovery of charge, percent wt | 103 | 113 | 117 | 109 | 101 | 99.6 | 103.2 |
| Yield of finished polymer, percent wt. of feed, no-loss basis | ca. 100 | 5.3 | 11.9 | 8.5 | 17.6 | 17.5 | 27.2. |
| Polymer Molecular Weight (ebullioscopic [2]) | 1100±50 | 890±40 | 690±30 | | (600-800)[5] | (400-500)[5] | (800-1000)[5]. |

[1] Experiments 1-3 were made in a stirred glass reactor with internal cooling coil; experiments 4-7 were made in a 250-ml. stainless steel autoclave. In the latter series, 3-methylbutene-1 was fed slowly and continuously by means of a high pressure syringe pump.

[2] Described in Daniels et al., Experimental Physical Chemistry, 1949, pp. 75-79.

[3] Catalyst added as suspension in all or part of total solvent, 5 mg. catalyst ml. of solvent.

[4] Monomer added uniformly during entire run period.

[5] Estimated visually by comparison with samples of known molecular weight.

Additional examples of specific embodiments of the invention are contemplated as follows:

Example I

Two moles of 3-methylpentene-1 are contacted for two hours in a stirred glass reactor with two moles of 1,2-$C_2H_4Cl_2$ solvent and 0.015 mole of $LiAlCl_4$ catalyst at 80° C. and about 20 p.s.i.g. A hydride-shift polymer having a number average molecular weight of about 800 is recovered by washing out catalyst with water and distilling off solvent.

Example II

Two moles of 3-ethylpentene-1 are contacted for one hour in a stirred glass reactor with two moles of isooctane solvent and 0.02 mole of $NaAlCl_4$ catalyst at 110° C. and about 25 p.s.i.g. A hydride-shift polymer having a number average molecular weight of about 1000 is recovered by filtering out catalyst and removing the solvent by distillation.

Example III

Two moles of 3-methylnonadecene-1

are stirred in a glass reactor with three moles of 1,2-dibromoethane solvent and 0.02 mole of $LiAlBr_4$ catalyst for two hours at 100° C. and 15 p.s.i.g. The resulting viscous polymeric oil is recovered by washing out the catalyst with water and then removing the solvent by evaporation at 1 mm. pressure at 100° C. The product will have a number average molecular weight of about 1600.

Example IV

One mole of 4-methylpentene-2 is placed in a stirred glass reactor with five moles of chloroform ($CHCl_3$) solvent and 0.01 mole $LiAlBr_4$ catalyst. The vessel is maintained at 100° C. and about 45 p.s.i.g. for two hours. Hydride-shift polymer having a number average molecular weight of about 600 is recovered by washing out the catalyst with water and distilling off the solvent.

I claim as my invention:

1. A process for hydride shift polymerization of olefins having the formula $R_1CH=CHCHR_2R_3$ where $R_1$ is selected from the group consisting of hydrogen, methyl, and ethyl, $R_2$ is selected from the group consisting of methyl, ethyl, and propyl, and $R_3$ is a normal alkyl group having from 1 to about 20 carbon atoms which comprises reacting the monomer at a temperature below about 150° C. and above about −50° C. in the presence of a catalyst having the chemical formula $M(AlX_4)_n$ where M is a metal, X is selected from a group consisting of chlorine, bromine and iodine, and $n$ is a whole number equal to the valence of M, and recovering a polymeric product with a number average molecular weight of at least about 300.

2. The process of claim 1 wherein the olefin is selected from the group consisting of 3-methylbutene-1 and 3-ethylpentene-1.

3. The process of claim 2 wherein the olefin is 3-ethylpentene-1.

4. A process for hydride shift polymerization of olefins having the formula $R_1CH=CHCHR_2R_3$ where $R_1$ is selected from the group consisting of hydrogen, methyl, and ethyl, $R_2$ is selected from the group consisting of methyl, ethyl, and propyl, and $R_3$ is a normal alkyl group having from 1 to about 20 carbon atoms which comprises reacting the monomer substantially in the liquid phase at a temperature below about 150° C. and above about −50° C. in the presence of a catalyst having the chemical formula $M(AlX_4)_n$ where M is a metal selected from the group consisting of group I, group II, and group VIII of the Periodic Table, X is selected from the group consisting of chlorine, bromine, and iodine, and $n$ is a whole number equal to the valence of M, and recovering a polymeric product with a number average molecular weight of at least about 300.

5. The process of claim 4 wherein the olefin is 3-methylbutene-1.

6. The process of claim 4 wherein M is selected from the group consisting of Li, Be, Na, Mg, Fe, Ni, Ag and Co.

7. The process of claim 6 wherein the olefin is 3-methylbutene-1.

8. A process for the 1,3-polymerization of 3-methylbutene-1 which comprises reacting the monomer substantially in the liquid phase at a temperature in the range of from about −50° C. to about 120° C. in the presence of a catalyst having the chemical formula $M(AlX_4)_n$ where M is a metal selected from the group consisting of group I, group II, and group VIII of the Periodic Table, X is selected from the group consisting of chlorine, bromine, and iodine, and $n$ is a whole number equal to the valence of M, and recovering a polymeric product with a number average molecular weight of at least about 300.

9. The process of claim 8 wherein M is selected from the group consisting of Li, Be, Na, Mg, Fe, Co, Ni, and Ag.

References Cited

UNITED STATES PATENTS

| | | | |
|---|---|---|---|
| 1,923,583 | 8/1933 | Pungs et al. | 260—683.15 |
| 2,082,454 | 6/1937 | Kuentzel et al. | 260—683.15 |
| 2,082,518 | 6/1937 | Ruthruff | 260—683.15 |
| 2,142,980 | 1/1939 | Huijser et al. | 260—683.15 |
| 3,281,490 | 10/1966 | Goble et al. | 260—683.2 |

PAUL M. COUGHLAN, JR., *Primary Examiner.*